(12) United States Patent
Komata et al.

(10) Patent No.: US 10,654,030 B2
(45) Date of Patent: May 19, 2020

(54) EXHAUST GAS PURIFICATION CATALYST FOR INTERNAL COMBUSTION ENGINE, AND EXHAUST GAS PURIFYING METHOD USING EXHAUST GAS PURIFICATION CATALYST

(71) Applicant: Umicore Shokubai Japan Co., Ltd., Tokoname-shi, Aichi (JP)

(72) Inventors: Kazuyoshi Komata, Himeji (JP); Hirotaka Kuno, Himeji (JP); Yuzo Hamada, Himeji (JP); Masashi Nakashima, Himeji (JP); Yuji Ogino, Himeji (JP); Masanori Ikeda, Himeji (JP)

(73) Assignee: UMICORE SHOKUBAI JAPAN CO., LTD., Tokoname-Shi, Aichi (JP)

( * ) Notice: Subject to any disclaimer, the term of this patent is extended or adjusted under 35 U.S.C. 154(b) by 0 days.

(21) Appl. No.: 16/318,424

(22) PCT Filed: Jul. 20, 2017

(86) PCT No.: PCT/JP2017/026354
§ 371 (c)(1),
(2) Date: Jan. 17, 2019

(87) PCT Pub. No.: WO2018/016606
PCT Pub. Date: Jan. 25, 2018

(65) Prior Publication Data
US 2019/0291083 A1    Sep. 26, 2019

(30) Foreign Application Priority Data
Jul. 20, 2016 (JP) .................. 2016-142849

(51) Int. Cl.
*F01N 3/28* (2006.01)
*B01J 23/63* (2006.01)
(Continued)

(52) U.S. Cl.
CPC .............. *B01J 23/63* (2013.01); *B01D 53/94* (2013.01); *B01D 53/9468* (2013.01);
(Continued)

(58) Field of Classification Search
CPC .......... B01J 23/63; F01N 3/2828; F01N 3/10; B01D 53/94; B01D 53/9472
(Continued)

(56) References Cited

U.S. PATENT DOCUMENTS

2004/0002621 A1    1/2004   Barnes et al.
2007/0014705 A1    1/2007   Franklin
(Continued)

FOREIGN PATENT DOCUMENTS

JP    H05-154382 A    6/1993
JP    H0838898 A      2/1996
(Continued)

OTHER PUBLICATIONS

Culley, et al., "The Impact of Passenger Car Motor Oil Phosphorus Levels on Automotive Emissions Control Systems", SAE Technical Paper Series, 961898, 1996, pp. 13-21.
(Continued)

*Primary Examiner* — Tom P Duong
(74) *Attorney, Agent, or Firm* — Buchanan Ingersoll & Rooney PC

(57) ABSTRACT

The present invention provides exhaust gas purification catalyst for an internal combustion engine, and exhaust gas purification method using the catalyst. The present invention provides the exhaust gas purification catalyst including a support, a first catalyst layer on an upstream side, a second catalyst layer on a downstream side, and a third catalyst layer. In the exhaust gas purification catalyst, the upstream portion of the third catalyst layer is present on the first catalyst layer, the downstream portion of the third catalyst
(Continued)

layer is present on the second catalyst layer, and in the middle portion between the upstream portion and the downstream portion of the third catalyst layer is present between the first catalyst layer and the second catalyst layer.

11 Claims, 2 Drawing Sheets

(51) Int. Cl.
    *B01D 53/94*     (2006.01)
    *B01J 21/04*     (2006.01)
    *B01J 23/44*     (2006.01)
    *B01J 23/46*     (2006.01)
    *B01J 35/00*     (2006.01)
    *B01J 37/02*     (2006.01)
    *B01J 37/03*     (2006.01)
    *B01J 37/10*     (2006.01)
    *F01N 3/10*     (2006.01)

(52) U.S. Cl.
CPC .......... *B01D 53/9472* (2013.01); *B01J 21/04* (2013.01); *B01J 23/44* (2013.01); *B01J 23/464* (2013.01); *B01J 35/0006* (2013.01); *B01J 37/0225* (2013.01); *B01J 37/0236* (2013.01); *B01J 37/0244* (2013.01); *B01J 37/038* (2013.01); *B01J 37/10* (2013.01); *F01N 3/10* (2013.01); *F01N 3/2828* (2013.01); *B01D 2255/1023* (2013.01); *B01D 2255/1025* (2013.01); *B01D 2255/2065* (2013.01); *B01D 2255/9022* (2013.01); *B01D 2255/9035* (2013.01); *B01D 2255/9202* (2013.01); *F01N 2510/0682* (2013.01); *F01N 2510/0684* (2013.01)

(58) Field of Classification Search
USPC .......................... 422/168; 502/101, 304, 223
See application file for complete search history.

(56) References Cited

U.S. PATENT DOCUMENTS

| | | |
|---|---|---|
| 2008/0038172 A1 | 2/2008 | Chen et al. |
| 2009/0203515 A1 | 8/2009 | Murabayashi |
| 2015/0238951 A1 | 8/2015 | Aoki et al. |
| 2015/0367328 A1 | 12/2015 | Ikeda et al. |
| 2016/0001228 A1 | 1/2016 | Chang et al. |
| 2017/0087541 A1* | 3/2017 | Andersen ........... B01D 53/8628 |
| 2017/0197179 A1 | 7/2017 | Yoshikawa |

FOREIGN PATENT DOCUMENTS

| | | |
|---|---|---|
| JP | 2001205051 A | 7/2001 |
| JP | 2005-530614 A | 10/2005 |
| JP | 2009501079 A | 1/2009 |
| JP | 2009-172527 A | 8/2009 |
| JP | 4350250 B2 | 10/2009 |
| JP | 2010-500922 A | 1/2010 |
| JP | 2010075835 A | 4/2010 |
| JP | 2010-167381 A | 8/2010 |
| JP | 4751917 B2 | 8/2011 |
| JP | 2011255270 A | 12/2011 |
| JP | 2014100658 A | 6/2014 |
| WO | 2007/057981 A1 | 5/2007 |
| WO | 2011/081219 A2 | 7/2011 |
| WO | 2014119749 A1 | 8/2014 |
| WO | 2016004151 A1 | 1/2016 |
| WO | 2015/182726 A9 | 2/2016 |

OTHER PUBLICATIONS

International Search Report (PCT/ISA/210) dated Oct. 24, 2017, by the Japanese Patent Office as the International Searching Authority for International Application No. PCT/JP2017/026354.
Written Opinion (PCT/ISA/237) dated Oct. 24, 2017, by the Japanese Patent Office as the International Searching Authority for International Application No. PCT/JP2017/026354.
The extended European search report dated Mar. 21, 2019, by the European Patent Office in European Patent Application No. 17631117.1. (7 pages).
The extended European search report dated Mar. 21, 2019, by the European Patent Office in corresponding European Patent Application No. 17831122.1. (7 pages).
Notification of Reasons for Refusal dated Mar. 12, 2019, by the Japanese Patent Office in Japanese Patent Application No. 2018-528874 and an English translation of the notification. (7 pages).
International Search Report and the Written Opinion of the International Searching Authority (Forms PCT/ISA/210 and PCT/ISA/237) dated Nov. 21, 2017, by the Japanese Patent Office in International Application No. PCT/JP2017/026334 and an English translation of the Report and Opinion. (15 pages).
International Preliminary Report on Patentability dated Jan. 22, 2019, by the International Bureau of WIPO in International Application No. PCT/JP2017/026334 and an English translation of the Report. (11 pages).
International Preliminary Report on Patentability dated Jan. 22, 2019, by the International Bureau of WIPO in corresponding International Application No. PCT/JP2017/026354 and an English translation of the Report. (17 pages).
Notice of Reason for Refusal dated Jul. 30, 2019, by the Japanese Patent Office in corresponding Japanese Patent Application No. 2018-528878, and an English translation of the Notice. (6 pages).
Examination Report dated Dec. 18, 2019, by the Intellectual Property Office of India in Indian Patent Application No. 201947005651. (6 pages).

* cited by examiner

[Fig. 1a]
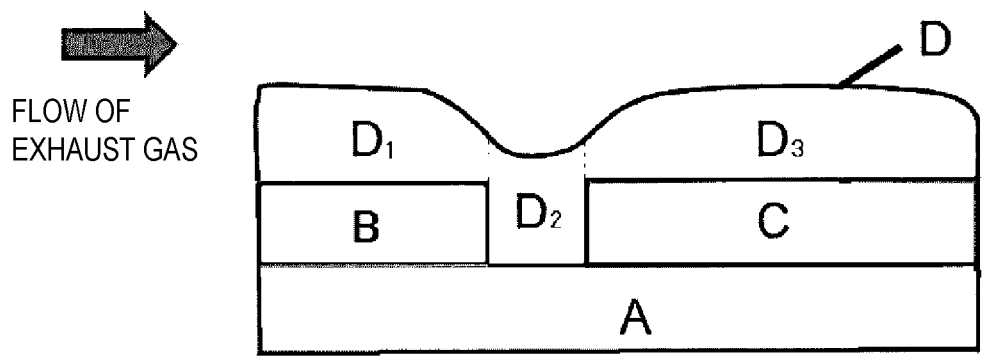
FLOW OF EXHAUST GAS
[Fig. 1b]
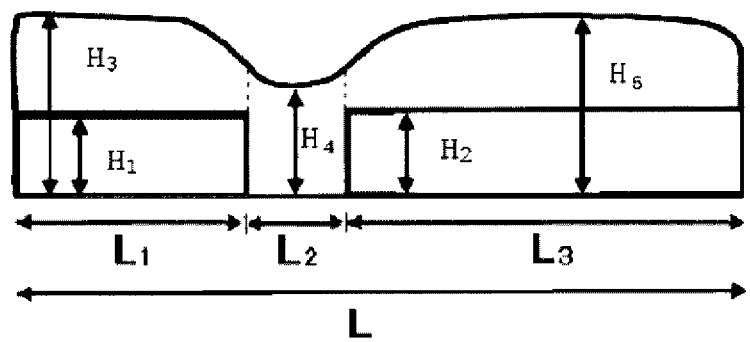
[Fig. 2]
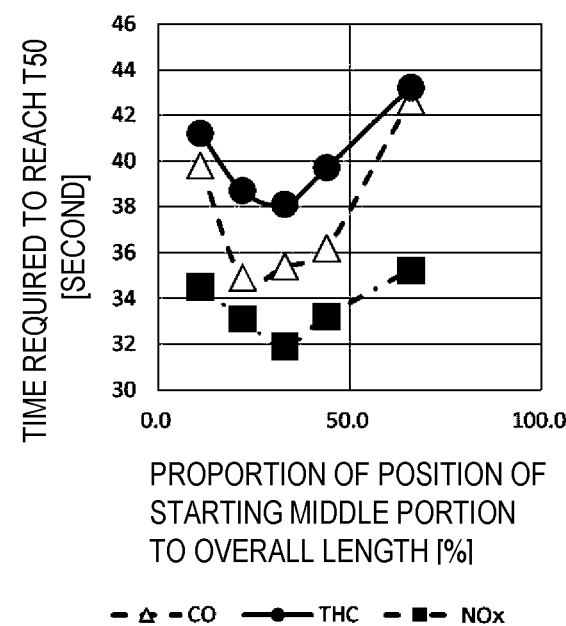
PROPORTION OF POSITION OF STARTING MIDDLE PORTION TO OVERALL LENGTH [%]
– △ – CO   —●— THC   – ■ – NOx

[Fig. 3]
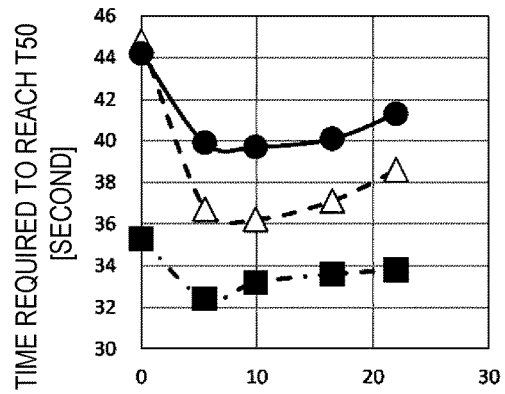
PROPORTION OF LENGTH OF MIDDLE PORTION TO OVERALL LENGTH OF CATALYST [%]
− △ − CO  —●— THC  − ■ − NOx
[Fig. 4]
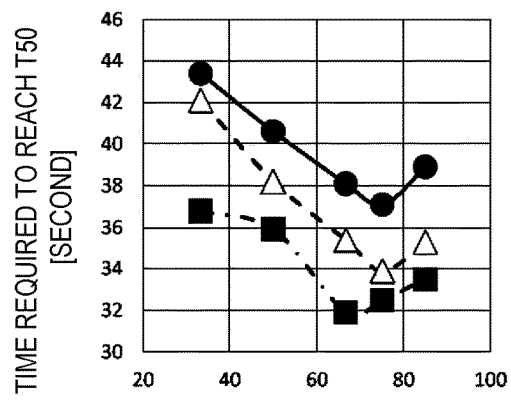
PROPORTION OF NOBLE METAL AMOUNT IN FIRST CATALYST LAYER TO TOTAL NOBLE METAL AMOUNT IN FIRST CATALYST LAYER AND SECOND CATALYST LAYER [%]
− △ − CO  —●— THC  − ■ − NOx
[Fig. 5]
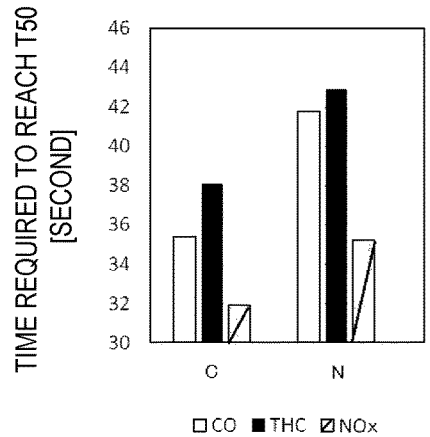
☐ CO  ■ THC  ▨ NOx

EXHAUST GAS PURIFICATION CATALYST FOR INTERNAL COMBUSTION ENGINE, AND EXHAUST GAS PURIFYING METHOD USING EXHAUST GAS PURIFICATION CATALYST

TECHNICAL FIELD

The present invention relates to exhaust gas purification catalyst for an internal combustion engine and exhaust gas purification method using the catalyst. In particular, the present invention relates to a purification catalyst having higher purification performance than that of a conventional catalyst, and exhaust gas purification method using the catalyst.

More specifically, the present invention relates to a catalyst that can be used for exhaust gas from an internal combustion engine even in an environment where the catalyst is exposed to high temperature and to a phosphorus compound-containing exhaust gas for an extended period of time, and a method for purifying exhaust gas (in particular, a phosphorus compound-containing exhaust gas) using this catalyst.

The present invention relates to a catalyst in which the deterioration of catalytic performance is suppressed, even if a large amount of phosphorus compound is attached to the catalyst.

BACKGROUND ART

A catalyst for purification of automobile exhaust gas has been conventionally developed. With tightening of regulations on automobile exhaust gas, the exhaust gas purification ability needs to be enhanced. In particular, a catalyst capable of achieving high exhaust gas purification performance under various engine use conditions is required.

For example, maintaining of exhaust gas purification performance over an extended period of time is required of an automobile exhaust gas purification device. This shows that an increase in lifespan of a catalyst for purification of exhaust gas is increasingly required. For the enhancement of the long-term durability of a catalyst, suppression of sintering of noble metal particles supported on the catalyst and suppression of sulfur poisoning are investigated. On the other hand, it is known that poisoning due to phosphorus contained in exhaust gas (hereinafter, referred to as "phosphorus poisoning") largely affects deterioration in catalytic performance (Non-Patent Literature 1). In order to satisfy further tightening regulations, suppression of phosphorus poisoning or enhancement of catalytic performance after phosphorus poisoning is important. In recent years, not only suppression of phosphorus poisoning but also suppression of deterioration in catalytic performance due to phosphorus poisoning even under exposure to exhaust gas of high temperatures of 950° C. or higher are required. Therefore, both the deterioration in catalytic performance due to sintering and the deterioration in catalytic performance due to phosphorus poisoning are required. Accordingly, the increase in lifespan of catalytic performance is strongly required as compared to the conventional catalyst.

As a substance causing phosphorus poisoning, a phosphorus compound derived from a lubricant additive, such as zinc dialkyl dithiophosphate, which is contained in exhaust gas, is known. When the exhaust gas flows through a purification device, the phosphorus compound contained in the exhaust gas is deposited on a catalyst layer and penetrates into the catalyst layer, resulting in phosphorus poisoning. The deterioration in catalytic performance due to such phosphorus poisoning is known (Non-Patent Literature 1).

It is known that the deterioration in catalytic performance due to phosphorus poisoning is caused by the following phenomenon. Due to the phosphorus compound that is deposited on and penetrates into the catalyst layer, diffusion of exhaust gas in the catalyst layer is inhibited. Further, cerium oxide as an oxygen occlusion and release material (also referred to as oxygen storage material) that is often used for a three-way catalyst reacts with the phosphorus compound to form cerium phosphate. Once the cerium phosphate is formed, occlusion and release of oxygen are stopped. Therefore, when exhaust gas atmosphere is changed to a lean or rich state, the effect of relaxing the lean or rich state due to occlusion and release of oxygen does not occur. Due to the occurrence of phenomena such as diffusion inhibition and inhibition of occlusion and release of oxygen, the exhaust gas purification rate is decreased.

Patent Literature 1 discloses that a composite oxide of ceria with zirconia is used for a catalyst using palladium in order to suppress phosphorus poisoning.

Patent Literature 1 discloses a catalyst using palladium in which the performance is likely to be deteriorated by phosphorus poisoning, and focuses on the easy formation of cerium phosphate due to ceria. Patent Literature 1 discloses that deterioration in catalytic performance due to phosphorus poisoning is suppressed compared to a conventional technique by replacing ceria with the composite oxide of ceria with zirconia. In Patent Literature 1, the deterioration in catalytic performance due to the phosphorus poisoning of a catalyst using rhodium that is the most active as a three-way catalyst is not investigated.

Patent Literature 2 discloses that deterioration in performance due to phosphorus poisoning is suppressed by providing a zone where a catalytic material is not applied, as a phosphorus capture zone on an upstream end of a catalyst.

A large amount of phosphorus compound is attached to an upstream side of a catalyst in the exhaust gas flow direction. As a countermeasure for the attachment, the catalyst described in Patent Literature 2 has a phosphorus capture zone that does not include a noble metal on the upstream end. However, Patent Literature 2 does not disclose catalytic performance after phosphorus poisoning. The effect thereof is not clear. When the length of the catalyst between the upstream end and a downstream end is relatively short, the phosphorus compound may be attached to the vicinity of the downstream end of the catalyst and deteriorates performance. Therefore, the long-term durability is not sufficient.

Patent Literature 3 discloses a catalyst in which a single layer of only a palladium-supporting layer is provided on an upstream end of a lower catalyst layer, an upper catalyst layer is laminated on a downstream side, and rhodium is supported.

Patent Literature 3 discloses that by providing a single palladium layer region on an upstream side of the catalyst, exhaust gas is likely to be diffused toward the lower catalyst layer. However, in Patent Literature 3, phosphorus poisoning is not investigated. The performance of the catalyst described in Patent Literature 3 under a condition where a phosphorus compound is contained in the exhaust gas is not clear.

Patent Literature 4 discloses a catalyst in which a lower catalyst layer is provided on a substrate over the whole between an upstream end and a downstream end, an upper catalyst layer is laminated on the lower catalyst layer on the upstream side and the downstream side, and a surface of the lower catalyst layer is exposed without laminating the upper catalyst layer at a middle portion between the upstream side and the downstream side. However, Patent Literature 4 does not disclose the overall length of the catalyst and a specific value for the middle layer. Further, Patent Literature 4 does not disclose that an object is to decrease the thermal capacity of the catalyst, decrease the resistance to the gas stream, and decrease a catalyst component, and catalyst poisoning due to phosphorus in exhaust gas can be improved by the relationship between the overall length of the catalyst and the middle portion.

CITATION LIST

Patent Literatures

Patent Literature 1: JP 8-38898 A
Patent Literature 2: JP 2009-501079 W
Patent Literature 3: JP 4751917 B2
Patent Literature 4: JP 4350250 B2

Non-Patent Literatures

Non-Patent Literature 1: A Scott et al., SAE Paper, 961898, (1996)

SUMMARY OF INVENTION

Technical Problem

However, further improvement of exhaust gas purification ability has been required from conventional catalyst.

For example, the catalysts disclosed in Patent Literatures 1 to 4 do not have sufficient exhaust gas purification ability, and in particular, the catalytic performance after phosphorus poisoning for an extended period of time is low.

Solution to Problem

The inventors of the present invention have intensively studied, and as a result, found that when in exhaust gas purification catalyst having a first catalyst layer on an upstream side, a second catalyst layer on a downstream side, and a third catalyst layer, a middle portion between an upstream portion and a downstream portion of the third catalyst layer is present between the first catalyst layer and the second catalyst layer, exhaust gas purification ability is improved. Thus, the present invention has been achieved.

According to preferred embodiments of the present invention, for example, the following catalysts and the like are provided.
(Item 1)
Exhaust gas purification catalyst including a support, a first catalyst layer on an upstream side, a second catalyst layer on a downstream side, and a third catalyst layer,
wherein an upstream portion of the third catalyst layer is present on a first catalyst layer,
a downstream portion of the third catalyst layer is present on a second catalyst layer, and
a middle portion between the upstream portion and the downstream portion a third catalyst layer is present between the first catalyst layer and the second catalyst layer.
(Item 2)
The catalyst according to item 1, wherein the thickness $H_4$ of the middle portion is smaller than a thickness $H_3$ of the upstream portion and a thickness $H_5$ of the downstream portion.

(Item 3)
The catalyst according to item 1 or 2, wherein the proportion of the length of the first catalyst layer to the overall length of the catalyst is 10% to 70%.
(Item 4)
The catalyst according to anyone of items 1 to 3, wherein a proportion of a length of the middle portion of the third catalyst layer to the overall length of the catalyst is 1% to 25%.
(Item 5)
The catalyst according to any one of claims 1 to 4, wherein all of the first catalyst layer, the second catalyst layer, and the third catalyst layer contain a noble metal, and the mass of the noble metal contained in the first catalyst layer is larger than a mass of the noble metal contained in the second catalyst layer.
(Item 6)
The catalyst according to any one of items 1 to 5, wherein the third catalyst layer contains rhodium and palladium, and the first catalyst layer and the second catalyst layer contain palladium.
(Item 7)
The catalyst according to any one of items 1 to 6, wherein the first catalyst layer, the second catalyst layer, and the third catalyst layer contain cerium.
(Item 8)
The catalyst according to any one of items 1 to 7 that is used for purification of exhaust gas containing a phosphorus compound from an engine.
(Item 9)
Exhaust gas purification method including a step of bringing exhaust gas into contact with the exhaust gas purification catalyst according to any one of items 1 to 8.

In the present invention, one or more features described above are intended to be provided not only as explicitly described combinations but also in further combination. Additional embodiments and advantages of the present invention are recognized by a person skilled in the art by reading and understanding the following detailed description, as necessary.

Advantageous Effect of Invention

A catalyst of the present invention shows on improved exhaust gas purification effect. In particular, the catalyst of the present invention has enhanced durability. The catalyst of the present invention can exhibit high catalytic performance even after exposure to high temperature. The catalyst of the present invention can exhibit high catalytic performance even after exposure to high temperature and exhaust gas containing a phosphorus compound for an extended period of time.

BRIEF DESCRIPTION OF DRAWINGS

FIG. 1a is a schematic cross-section view of one example of exhaust gas purification catalyst of the present invention.

FIG. 1b is a schematic cross-section view illustrating the length and thickness of a catalyst layer as an example of the exhaust gas purification catalyst of the present invention.

FIG. 2 is a graph in which the horizontal axis is the proportion [%] of the length of a first catalyst layer to the overall length of catalysts A to E and the vertical axis is the time [in seconds] required to reach T50.

FIG. 3 is a graph in which the horizontal axis is the proportion [%] of the length of a middle portion to the overall length of catalysts D, F, G, H, and I and the vertical axis is a time [second] required to reach T50.

FIG. 4 is a graph in which the horizontal axis is the proportion [%] of noble metal amount in a first catalyst layer to the total noble metal amount in the first catalyst layer and a second catalyst layer of catalysts C, J, K, L, and M and the vertical axis is a time [second] required to reach T50.

FIG. 5 is a graph in which the vertical axis is the time [in seconds] required to reach T50 for catalysts C and N.

DESCRIPTION OF EMBODIMENTS

Description of Preferred Embodiments

Hereinafter, preferred embodiments of the present invention will be described.

The following embodiments are provided for better understanding of the present invention. It is understood that the scope of the present invention should not be limited to the following description. Therefore, it is apparent that a person skilled in the art can appropriately make modifications within the scope of the present invention while referring to the description herein. It is understood that the following embodiments of the present invention can be used alone or in combination.

Since Japanese basically does not include a singular form or a plural form, an expression that does not discriminate the singular form and the plural form is understood as including the concepts of both the singular form and the plural form throughout the entire specification, unless otherwise specified. Therefore, in a foreign language specification made on the basis of this specification, even when the expression of the singular form is used, it should be understood that the concepts of both the singular form and the plural form intended in a Japanese specification are included unless otherwise specified. Thus, it should be understood that terms with singular articles (e.g., "a," and "an") in the foreign language specification include the concept of the plural form unless otherwise specified. Further, it should be understood that terms used in the present specification have the meanings generally used in the field unless otherwise specified. Accordingly, unless otherwise defined, all technical terms and scientific terms used herein have the same meanings as commonly understood by a person skilled in the art to which the present invention belongs. When definition of terms is described herein, the terms are understood on the basis of the definition.

(Definition of Terms)

Terms in the present specification will be described below.

Herein, a "catalyst layer" is a layer formed from a material containing a refractory inorganic oxide and a catalyst component on a support, or a layer further formed from a material containing the catalyst component on another catalyst layer. In the present invention, the "catalyst layer" includes a first catalyst layer, a second catalyst layer, and a third catalyst layer.

Herein, a "support" is, for example, a refractory three-dimensional structure supporting the catalyst component and the like. Specifically, the support is an integrally-molded support, or a monolith honeycomb support. On the support, the catalyst layer can be formed.

"Per liter of a support" means "per liter of bulk volume of the support including the volume of gaps formed in the support." The mass of each component per liter of the support can be represented by g/L. In consideration of a catalyst produced so that the catalyst layer is not formed on an outside surface of the support in which exhaust gas is unlikely to flow, and the thickness of a catalyst layer that is smaller than the size of the support by about three orders of magnitude even when the catalyst layer is formed on the outside surface of the support, the volume of the support is similar to the volume of the catalyst. Therefore, "per liter of the support" and "per liter of volume of the catalyst" can be treated similarly to each other.

Herein, "upstream" is a portion near a side where exhaust gas flows into the catalyst, and "downstream" is a portion near a side where exhaust gas is discharged from the catalyst.

Herein, "laminating" B layer on A layer means that B layer is present on or above A layer. In this case, one or more layers may be present between A layer and B layer. In a "laminating" state, a layer may be present on the support.

"Directly laminating" B layer on A layer means that an upper surface of A layer is in contact with a bottom surface of B layer. For example, in a catalyst shown in FIG. 1a, an upstream portion ($D_1$) of a third catalyst layer is directly laminated on a first catalyst layer (B), and a downstream portion ($D_3$) of the third catalyst layer is directly laminated on a second catalyst layer (C). In a "directly laminating" state, a layer may also be directly laminated on the support.

Herein, the "length of catalyst layer" in each catalyst layer is a distance in an exhaust gas flowing direction of a region where the catalyst layer is laminated on the support.

Herein, the "thickness of catalyst layer" in each catalyst layer is a distance in a direction perpendicular to the exhaust gas flowing direction of the region where the catalyst layer is laminated on the support.

Herein, a "phosphorus compound" is a compound containing a phosphorus element.

Herein, "phosphorus poisoning" is a phenomenon where a phosphorus compound contained in exhaust gas comes into contact with the catalyst and deteriorates the purification ability of the catalyst.

Herein, "per liter of volume of the catalyst" means "per liter of bulk volume of the catalyst including the volume of gaps formed in the catalyst." The mass of each component per liter of volume of the catalyst can be represented by g/L.

Herein, when a range is represented by an expression of "A to B," the range means "A or more and B or less." That is, the range includes the upper limit value and the lower limit value.

(Exhaust Gas Purification Catalyst)

The catalyst of the present invention is exhaust gas purification catalyst, and includes a support, a first catalyst layer on an upstream side, a second catalyst layer on a downstream side, and a third catalyst layer.

The "first catalyst layer" is a layer that is directly laminated on the support or a layer that is laminated on one or more layers laminated on the support in the catalyst. The first catalyst layer is a layer laminated on the upstream side. The "second catalyst layer" is a layer that is directly laminated on the support or a layer that is laminated on one or more layers laminated on the support in the catalyst. The second catalyst layer is a layer laminated on the downstream side. The first catalyst layer is present on the upstream side of the second catalyst layer with a middle portion being present between the first catalyst layer and the second catalyst layer.

The "third catalyst layer" is a layer laminated above the first catalyst layer and the second catalyst layer in the catalyst. The third catalyst layer consists of an upstream portion, a downstream portion, and the middle portion between the upstream portion and the downstream portion. The upstream portion of the third catalyst layer is present on the first catalyst layer, the downstream portion of the third catalyst layer is present on the second catalyst layer, and the middle portion between the upstream portion and the downstream portion of the third catalyst layer is present between the first catalyst layer and the second catalyst layer.

Between the first catalyst layer and the second catalyst layer, not only the middle portion of the third catalyst layer may be directly laminated on the support, but also one or more layers between the third catalyst layer and the support may be present. Here, one or more layers may be present between the third catalyst layer and the first catalyst layer. One or more layers may be present between the third catalyst layer and the second catalyst layer. One or more layers may be present between the first catalyst layer and the support. One or more layers may be present between the second catalyst layer and the support.

Hereinafter, the configuration of exhaust gas purification catalyst according to an embodiment of the present invention will be described with reference to FIG. 1a. FIG. 1a is a view schematically illustrating the positional relationship of each catalyst layer. FIG. 1a does not show the actual distance and shape.

The configuration of the catalyst of the present invention is not limited to the drawing. For example, as shown in FIG. 1a, the catalyst of the present invention includes a support (A), a first catalyst layer (B) on an upstream side, a second catalyst layer (C) on a downstream side, and a third catalyst layer (D: the third catalyst layer (D) consisting of an upstream portion ($D_1$), a middle portion ($D_2$), and a downstream portion ($D_3$)). The upstream portion ($D_1$) of the third catalyst layer is present on the first catalyst layer (B), the downstream portion ($D_3$) of the third catalyst layer is present on the second catalyst layer (C), and the middle portion ($D_2$) between the upstream portion ($D_1$) and the downstream portion ($D_3$) of the third catalyst layer is present between the first catalyst layer (B) and the second catalyst layer (C). In FIG. 1b, L is the overall length of the catalyst, $L_1$ is the length of the first catalyst layer (the upstream portion of the third catalyst layer), $L_2$ is the length of the middle portion, and $L_3$ is the length of the second catalyst layer (the downstream portion of the third catalyst layer).

(Length of Catalyst Layer)

The first catalyst layer is provided from an end face on the inflow side toward the outflow side. The length of the first catalyst layer corresponds to a position of starting the middle portion, as shown in FIG. 1a. Specifically, the proportion ($L_1/L \times 100$) of the length of the first catalyst layer to the overall length of the catalyst shows the position of starting the middle portion in the overall length of the catalyst, and is preferably 10% or more, more preferably 15% or more, and the most preferably 25% or more. The proportion ($L_1/L \times 100$) is preferably 70% or less, more preferably 60% or less, and the most preferably 48% or less. When the length of the first catalyst layer is too short, the spatial velocity relative to the total volume of the first catalyst layer is high, and the contact time of exhaust gas and the first catalyst layer is short. Therefore, the purification of exhaust gas does not sufficiently proceed, and this is not preferable. When the length of the first catalyst layer is too long, the starting position of the middle portion is close to the downstream side. Thus, a phosphorus compound in a desired proportion is unlikely to be deposited at the middle portion. Therefore, the performance is likely to deteriorate due to phosphorus poisoning, and this is not preferable.

Herein, the length of each catalyst layer is an average value ((Lmin+Lmax)/2) of the shortest value Lmin and the longest value Lmax of the length of the catalyst layer.

The proportion ($L_2/L \times 100$) of the length of the middle portion to the overall length of the catalyst is preferably 1% or more, more preferably 4% or more, and the most preferably 7% or more. The proportion ($L_2/L \times 100$) of the length of the middle portion to the overall length of the catalyst is preferably 25% or less, more preferably 18% or less, and the most preferably 12% or less. When the proportion of the length of the middle portion to the overall length of the catalyst is too small, the phosphorus compound cannot be sufficiently deposited. Therefore, this is not preferable. When the proportion is too large, the length of the first catalyst layer is too short. Therefore, this is not preferable. In this case, the length of the second catalyst layer is too short. Therefore, this is not preferable.

The proportion ($L_3/L \times 100$) of the length of the second catalyst layer to the overall length of the catalyst is preferably 35% or more, more preferably 50% or more, and the most preferably 55% or more. The proportion ($L_3/L \times 100$) of the length of the second catalyst layer to the overall length of the catalyst is preferably 95% or less, more preferably 90% or less, and the most preferably 80% or less. The second catalyst layer is provided from an end face on the outflow side toward the inflow side. When the length of the second catalyst layer is too short, the middle portion is close to the outflow side. Thus, the phosphorus compound is unlikely to be deposited in a desired proportion at the middle portion. Therefore, performance is likely to deteriorate due to phosphorus poisoning, and this is not preferable. When the length of the second catalyst layer is too long, the second catalyst layer is likely to suffer from phosphorus poisoning. This is not preferable.

In one preferred embodiment, the sum of the length of the first catalyst layer, the length of the second catalyst layer, and the length of the middle portion is equal to the length of the support. In one preferred embodiment, the length of the third catalyst layer is equal to the length of the support. In a more preferred embodiment, the sum of the length of the first catalyst layer, the length of the second catalyst layer, and the length of the middle portion is equal to the length of the support, and the length of the third catalyst layer is equal to the length of the support. The length of the first catalyst layer is preferably 0.5 or more times, more preferably 1.0 or more time, and the most preferably 1.8 or more times the length of the second catalyst layer. The length of the first catalyst layer is preferably 5 or less times, more preferably 4 or less times, and the most preferably 3 or less times the length of the second catalyst layer.

(Thickness of Catalyst Layer)

The thicknesses of the first catalyst layer, the second catalyst layer, and the third catalyst layer are not particularly limited. The thicknesses can be appropriately set so that the exhaust gas purification ability can be appropriately carried out. When the thickness of each of the catalyst layers is too large, the exhaustion pressure is high. Therefore, this is not preferable. When it is too small, sufficient purification efficiency is not obtained. Therefore, this is not preferable.

It is preferable that the sum $H_3$ of the thickness of the first catalyst layer B and the thickness of the upstream portion $D_1$ of the third catalyst layer be larger than the thickness $H_4$ of the middle portion of the third catalyst layer. $H_4$ is preferably 40% or more of $H_3$. $H_4$ is preferably 95% or less, more preferably 80% or less, and the most preferably 70% or less, of $H_3$.

It is preferable that the sum $H_5$ of the thickness of the second catalyst layer C and the thickness of the downstream portion $D_3$ of the third catalyst layer be larger than the thickness $H_4$ of the middle portion of the third catalyst layer.

H₄ is preferably 40% or more of $H_5$. $H_4$ is preferably 95% or less, more preferably 80% or less, and the most preferably 70% or less, of $H_5$.

The sum $H_5$ of the thickness of the second catalyst layer C and the thickness of the downstream portion $D_3$ of the third catalyst layer is preferably 40% or more of the sum $H_3$ of the thickness of the first catalyst layer B and the thickness of the upstream portion $D_1$ of the third catalyst layer. The sum $H_5$ of the thickness of the second catalyst layer and the thickness of the downstream portion $D_3$ of the third catalyst layer is preferably 100% or less, more preferably 95% or less, and the most preferably 90% or less, of the sum $H_3$ of the thickness of the first catalyst layer and the thickness of the upstream portion $D_1$ of the third catalyst layer.

The thickness of each of the catalyst layers is an average value ((Hmin+Hmax)/2) of the smallest value Hmin and the largest value Hmax among the thicknesses of each of the catalyst layers. The thickness of each of the catalyst layers is not necessarily uniform over the whole of each of the catalyst layers. However, it is preferable that the thickness be substantially uniform over substantially the whole of each catalyst layer.

(Support)

As the support, a support that is known as a support for exhaust gas purification catalyst can be used. It is preferable that the support have a three-dimensional shape that allows exhaust gas to efficiency come into contact with the catalyst layers. For example, a honeycomb shape may be preferably used. Further, an integrally-molded support (monolithic structure) may be preferably used. For example, a monolith honeycomb support, a metal honeycomb support, a plug honeycomb support such as a diesel particulate filter, or a punching metal is preferably used.

A monolith honeycomb support that is usually referred to as a ceramic honeycomb support is suitably used. In particular, a honeycomb support formed from a material such as cordierite, mullite, α-alumina, zirconia, titania, titanium phosphate, aluminum titanate, betalite, spodumene, aluminosilicate, and magnesium silicate is preferable. Among these, a honeycomb support formed from a cordierite material is particularly preferable. Alternatively, a monolithic structure formed from an oxidation-resistant heat-resistant metal such as stainless steel and a Fe—Cr—Al alloy is used. These monolith supports are produced by an extrusion molding method, or a method of tightly winding a sheet-shaped element. As the shape of a gas passage port (cell shape), any known shape can be used. For example, a hexagonal, rectangular, triangular, or corrugation shape can be used. The cell density (cell number/unit cross-sectional area) is preferably 100 cells/square inch (6.45 cm²) or more, and more preferably 200 cells/square inch (6.45 cm²) or more, and preferably 600 cells/square inch (6.45 cm²) or less, and more preferably 500 cells/square inch (6.45 cm²) or less.

The length of the support can be appropriately set, and is preferably 10 mm or more, more preferably 15 mm or more, and further preferably 30 mm or more, and preferably 1000 mm or less, more preferably 300 mm or less, and further preferably 200 mm or less. When the length of the support is too short, purification is not sufficiently performed. When it is too long, the mass of the catalyst is large.

(Material for Catalyst Layer)

The first catalyst layer, the second catalyst layer, and the third catalyst layer each contain a catalyst component. Preferable examples of the catalyst components include a noble metal, an oxygen storage material, an oxide of a group 2 element, an oxide of a group 1 element, a refractory inorganic oxide (except for the oxygen storage material, the oxide of a group 2 element, and the oxide of a group 1 element), a compound of group 2 element (except for the oxide), a compound of a group 1 element (except for the oxide), and a rare earth metal compound (except for the oxygen storage material).

Specific examples of noble metal include platinum (Pt), palladium (Pd), rhodium (Rh), iridium (Ir), and ruthenium (Ru). It is preferable that Pt, Pd, or Rh be used. Only one type of the noble metal may be used alone, or two or more types thereof may be used in combination. Without being bound by theory, this is because palladium allows hydrocarbon (HC) and carbon monoxide (CO) in exhaust gas to be efficiently purified and rhodium allows nitrogen oxide ($NO_x$) to be efficiently purified. In addition to rhodium and palladium, the noble metal may further include, but is not limited to, other noble metal elements (e.g., gold, silver, platinum, ruthenium, osmium, and iridium).

A noble metal contained in the first catalyst layer is preferably rhodium and/or palladium, and more preferably palladium. One type of the noble metal may be used alone, or two or more types thereof may be used in combination. A noble metal contained in the second catalyst layer is preferably rhodium and/or palladium, and more preferably palladium. One type of the noble metal may be used alone, or two or more types thereof may be used in combination. A noble metal contained in the third catalyst layer is preferably rhodium and/or palladium and/or platinum, and more preferably rhodium and/or palladium. One type of the noble metal may be used alone, two types thereof may be used in combination, or three types thereof may be used in combination.

In a case of using the noble metal, the amounts (supported amounts) of the noble metals used in the catalyst layers are not particularly limited, and can be appropriately selected depending on specifications of the engine used. A sufficient amount of the noble metal can achieve a highly efficient exhaust gas purification.

When the noble metal is palladium, the amount of the noble metal in the first catalyst layer is preferably 0.05 g or more, more preferably 0.07 g or more, and further preferably 0.1 g or more, per liter of volume of the catalyst. When the noble metal is palladium, the amount of the noble metal in the first catalyst layer is preferably 15 g or less, more preferably 10 g or less, and further preferably 5 g or less, per liter of volume of the catalyst. When the amount of the noble metal is too large, the cost of the catalyst is high. When the noble metal is rhodium, the amount of the noble metal in the first catalyst layer is preferably 0.01 g or more, more preferably 0.05 g or more, and further preferably 0.1 g or more, per liter of volume of the catalyst. When the noble metal is rhodium, the amount of the noble metal in the first catalyst layer is preferably 10 g or less, more preferably 8 g or less, and further preferably 5 g or less, per liter of volume of the catalyst. When the amount of the noble metal is too large, the cost of the catalyst is high. When the amount of the noble metal is too small, the exhaust gas purification performance after thermal degradation or phosphorus poisoning cannot be sufficient, and this is not preferable.

For the proportions of the amount of the noble metal contained in the first catalyst layer and the mass of the noble metal contained in the second catalyst layer, the proportion of the mass of the noble metal contained in the first catalyst layer is, with the sum of the mass of the noble metal contained in the first catalyst layer and the mass of the noble metal contained in the second catalyst layer as 100%, preferably 20% or more, more preferably 30% or more, further preferably 40% or more, significantly preferably 50% or more, and particularly preferably 60% or more. The proportion of the mass of the noble metal elements contained in the first catalyst layer is preferably 100% or less, more preferably 86% or less, further preferably 80% or less, significantly preferably 74% or less, and particularly preferably 70% or less.

The proportion of the mass of the noble metal contained in the third catalyst layer to the sum of the mass of the noble metal contained in the first catalyst layer and the mass of the noble metal contained in the second catalyst layer is, with the sum of the mass of the noble metal contained in the first catalyst layer and the mass of the noble metal contained in the second catalyst layer as 100%, preferably 0% or more, more preferably 5% or more, further preferably 8% or more, and significantly preferably 10% or more. The proportion of the mass of the noble metal contained in the third catalyst layer is preferably 150% or less, more preferably 100% or less, further preferably 80% or less, significantly preferably 60% or less, and particularly preferably 40% or less.

In the present invention, when the third catalyst layer contains rhodium and palladium, the ratio (Pd/Rh) of the amount of palladium to the amount of rhodium is not particularly limited, and is preferably 0.1 or more, more preferably 0.3 or more, and further preferably 0.6 or more. When the third catalyst layer contains rhodium and palladium, the ratio (Pd/Rh) of the amount of palladium to the amount of rhodium is not particularly limited, and is preferably 5 or less, more preferably 2 or less, and further preferably 1.35 or less. When the ratio Pd/Rh is too low, the warming-up properties are not favorable, and therefore, this is not preferable. When it is too high, the deterioration in performance due to phosphorus poisoning is significant, and therefore, this is not preferable.

A compound of the noble metal element used in a preparation method described above is not particularly limited. For example, palladium or rhodium and palladium may be added in a form as it is, or added in another form and then converted into a desired form (a form of Pd, or Rh and Pd). In a preferred embodiment of the present invention, it is preferable that a compound of rhodium, or a compound of rhodium and a compound of palladium be added to an aqueous medium. In the embodiment, it is preferable that rhodium, or rhodium and palladium be added in another form, and particularly in a form of a water-soluble noble metal salt. Hereinafter, the compound of the noble metal element is also referred to as "water-soluble noble metal salt." Here, a usable water-soluble noble metal salt is not particularly limited. Various types of raw materials for a noble metal catalyst component used in the field of exhaust gas purification can be used. In case of rhodium, specific examples of the raw material include rhodium; a halide such as rhodium bromide and rhodium chloride; an inorganic salt such as a dinitrodiammine salt, a hexaammine salt, a hexahydroxo acid salt, a tetraammine salt, and a tetranitro acid salt of rhodium; a carboxylate such as an acetate; and a hydroxide, an alkoxide, and an oxide. Preferable examples thereof include a dinitrodiammine salt, a hexaammine salt, a hexahydroxo acid salt, and a tetraammine salt. A dinitrodiammine salt (dinitrodiammine rhodium) and a tetraammine salt are more preferable. In case of palladium, examples of the raw material include palladium; a halide such as palladium chloride; an inorganic salt such as a nitrate, a sulfate, a dinitrodiammine salt, a hexaammine salt, a tetraammine salt, and a hexacyano acid salt of palladium; a carboxylate such as an acetate; and a hydroxide, an alkoxide, and an oxide. Preferable examples thereof include a nitrate, a hexaammine salt, and a tetraammine salt. A nitrate (palladium nitrate) and a tetraammine salt are more preferable. In the present invention, for each of the compounds of rhodium and palladium (rhodium and palladium sources), one type of compound may be used alone, or a mixture of two or more types thereof may be used.

A presence state of the catalyst components in each of the catalyst layers is not particularly limited. For example, the catalyst components may be dispersed alone in a catalyst layer formed on a surface of the support, or the catalyst component that is supported on a refractory inorganic oxide described below may be dispersed in the catalyst layer. In particular, it is preferable that a catalyst active component be supported on an oxygen storage material described below. When the noble metal is supported on the oxygen storage material, oxygen that is stored in and then released from the oxygen storage material can be efficiently used in an oxidation-reduction reaction that is catalyzed by the noble metal.

Preferable examples of the oxygen storage material include cerium oxide, and oxides of cerium and another element such as a cerium-zirconium composite oxide, a cerium-zirconium-lanthanum composite oxide, a cerium-zirconium-lanthanum-neodymium composite oxide, and a cerium-zirconium-lanthanum-yttrium composite oxide. The crystal structure of the oxygen storage material is a cubic crystal, a tetragonal crystal, a monoclinic crystal, a rhombic crystal, or the like. A cubic crystal, a tetragonal crystal, and a monoclinic crystal are preferable, and a cubic crystal and a tetragonal crystal are more preferable.

A cerium raw material used as the oxygen storage material, such as a cerium-zirconium composite oxide, is not particularly limited. A raw material used in the field of exhaust gas purification may be used. Specific examples thereof include a nitrate such as cerous nitrate, a carbonate, and a sulfate. Among these, a nitrate is preferably used. In the present invention, as a source of the cerium, the material may be used alone, or a mixture of two or more types thereof may be used. Here, the amount of the cerium source to be added is preferably 1 g or more, more preferably 3 g or more, and further preferably 5 g or more, per liter of the support (e.g., refractory three-dimensional structure) in terms of cerium oxide ($CeO_2$). The amount of the cerium source to be added is preferably 200 g or less, more preferably 100 g or less, and further preferably 50 g or less, per liter of the support (e.g., refractory three-dimensional structure) in terms of cerium oxide ($CeO_2$).

A zirconium raw material is not particularly limited, and a raw material used in the field of exhaust gas purification can be used. Specific examples thereof include zirconium oxynitrate, zirconium oxychloride, zirconium nitrate, and basic zirconium sulfate. Among these, zirconium oxynitrate or zirconium nitrate is preferably used. In the present invention, as a source of the zirconium, the material may be used alone, or a mixture of two or more types thereof may be used. Here, the amount of the zirconium source to be added is preferably 5 g or more, more preferably 10 g or more, and further preferably 20 g or more, per liter of the support (e.g., refractory three-dimensional structure) in terms of zirconium oxide ($ZrO_2$). The amount of the zirconium source to be added is preferably 200 g or less, more preferably 150 g or less, and further preferably 100 g or less, per liter of the support (e.g., refractory three-dimensional structure) in terms of zirconium oxide ($ZrO_2$).

A lanthanum raw material is not particularly limited, and a raw material used in the field of exhaust gas purification can be used. Specific examples thereof include lanthanum hydroxide, lanthanum nitrate, lanthanum acetate, and lanthanum oxide. Among these, lanthanum nitrate and lanthanum hydroxide are preferable. As a source of the lanthanum, the material may be used alone, or a mixture of two or more types thereof may be used. Here, the amount of the lanthanum source to be added may be 0 g, and is preferably 0.1 g or more, more preferably 0.5 g or more, and further preferably 1 g or more, per liter of the support (e.g., refractory three-dimensional structure) in terms of lanthanum oxide ($La_2O_3$). The amount of the lanthanum source to be added is preferably 50 g or less, more preferably 35 g or less, and further preferably 20 g or less, per liter of the support (e.g., refractory three-dimensional structure) in terms of lanthanum oxide ($La_2O_3$).

An yttria raw material is not particularly limited, and a raw material used in the field of exhaust gas purification can be used. Specific examples thereof include yttrium hydroxide, yttrium nitrate, yttrium oxalate, and yttrium sulfate. Among these, yttrium hydroxide or yttrium nitrate is preferably used. In the present invention, as a source of the yttrium, the material may be used alone, or a mixture of two or more types thereof may be used. Here, the amount of the yttrium source to be added may be 0 g, and is preferably 0.1 g or more, more preferably 0.5 g or more, and further preferably 1 g or more, per liter of the support (e.g., refractory three-dimensional structure) in terms of yttrium oxide ($Y_2O_3$). The amount of the yttrium source to be added is preferably 50 g or less, more preferably 35 g or less, and further preferably 20 g or less, per liter of the support (e.g., refractory three-dimensional structure) in terms of yttrium oxide ($Y_2O_3$).

A neodymium raw material is not particularly limited, and a raw material used in the field of exhaust gas purification can be used. Specific examples thereof include neodymium hydroxide, neodymium nitrate, neodymium oxalate, and neodymium sulfate. Among these, neodymium hydroxide or neodymium nitrate is preferably used. In the present invention, as a source of the neodymium, the material may be used alone, or a mixture of two or more types thereof may be used. Here, the amount of the neodymium source to be added may be 0 g, and is preferably 0.1 g or more, more preferably 0.5 g or more, and further preferably 1 g or more, per liter of the support (e.g., refractory three-dimensional structure) in terms of neodymium oxide ($Nd_2O_5$). The amount of the neodymium source to be added is preferably 50 g or less, more preferably 35 g or less, and further preferably 20 g or less, per liter of the support (e.g., refractory three-dimensional structure) in terms of neodymium oxide ($Nd_2O_5$).

The shape of the oxygen storage material is not particularly limited. Preferable example of the shape of the oxygen storage material include a particle shape, a microparticle shape, a powder shape, a cylindrical shape, a conical shape, a prismatic shape, a cubic shape, a pyramid shape, and an amorphous shape. The shape of the oxygen storage material is more preferably a particle shape, a microparticle shape, or a powder shape. When the shape of the oxygen storage material is a particle shape, a microparticle shape, or a powder shape, the average particle diameter of the oxygen storage material is not particularly limited, and is preferably 1.0 μm or more, and more preferably 5.0 μm or more, and preferably 100 μm or less, and more preferably 20.0 μm or less. The "average particle diameter" of the oxygen storage material can be measured by a known method such as classification.

It is preferable that the oxygen storage material have an appropriate BET specific surface area. Due to the appropriate BET specific surface area, the oxygen storage material has high ability of storing and releasing oxygen in exhaust gas. The BET specific surface area of the oxygen storage material is preferably 10 $m^2$/g or more, and more preferably 50 $m^2$/g or more, and preferably 300 $m^2$/g or less, and more preferably 200 $m^2$/g or less.

A method for producing the oxygen storage material is not particularly limited. A product produced by each of various known methods can be used.

The first catalyst layer, the second catalyst layer, and the third catalyst layer may each contain a group 1 element, a group 2 element, a rare earth metal element, and another transition metal element, if necessary. Examples of the group 1 element and the group 2 element include potassium, magnesium, calcium, strontium, and barium. One type of the group 1 element or the group 2 element may be used alone, or a mixture of two or more types thereof may be used. The group 1 element or the group 2 element that is used in the present invention can be used in a form of oxide, sulfate, carbonate, or nitrate. The forms of oxide, sulfate, and carbonate are preferable. As barium sulfate, $BaSO_4$ may be used. The amount of barium sulfate may be 0 g, and is preferably 0.1 g or more, more preferably 0.3 g or more, and further preferably 0.5 g or more, per liter of the support (e.g., refractory three-dimensional structure) in terms of $BaSO_4$. The amount of barium sulfate is preferably 50 g or less, more preferably 30 g or less, and further preferably 20 g or less, per liter of the support (e.g., refractory three-dimensional structure) in terms of $BaSO_4$.

(Refractory Inorganic Oxide)

It is preferable that the catalyst layers used for the exhaust gas purification catalyst of the present invention contain a refractory inorganic oxide. The refractory inorganic oxide may be used as a catalyst-supporting material in which the catalyst active component such as the noble metal, a rare earth metal, and another metal element is supported. As the refractory inorganic oxide, any inorganic oxide that is known as a material supporting a catalyst component for purification of exhaust gas can be used. Specific examples thereof include aluminum oxide ($Al_2O_3$) such as α-alumina, and activated alumina including γ-alumina, δ-alumina, η-alumina, and θ-alumina; silicon oxide ($SiO_2$); titanium oxide (titania) ($TiO_2$); zirconium oxide ($ZrO_2$); phosphorus oxide ($P_2O_5$); zeolite phosphate; and composite oxides thereof such as alumina-titania, alumina-zirconia, and titania-zirconia. Among these, aluminum oxide, silicon oxide (silica), phosphorus oxide, titanium oxide, and zirconium oxide are preferable, silicon oxide (silica) and aluminum oxide are more preferable, and a powder of activated alumina is further preferable. Here, one type of the refractory inorganic oxide may be used alone, or a mixture of two or more types thereof may be used. Further, the refractory inorganic oxides may be used in a form of oxide described above, or a precursor capable of forming an oxide by heating may be used. Examples of the precursor capable of forming an oxide by heating include a hydroxide, a nitrate, a halide such as chloride, an acetate, a sulfate, and carbonates of aluminum, silicon, titanium, zirconium, and phosphorus described above.

The amount of the refractory inorganic oxide contained in the catalyst of the present invention is preferably 10 g or more, and more preferably 50 g or more, and preferably 300 g or less, and more preferably 150 g or less, per liter of volume of the catalyst. When a sufficient amount of the refractory inorganic oxide is used, the catalyst component such as the noble metal can be sufficiently dispersed, and the durability can be sufficiently secured. Since the amount of the refractory inorganic oxide is not excessive, the catalyst component such as the noble metal can be appropriately brought into contact with exhaust gas. Therefore, the temperature is likely to be increased, and an oxidation-reduction reaction can be suitably carried out.

From the viewpoint of supporting the catalyst active component such as the noble metal, the BET specific surface area of the refractory inorganic oxide is preferably 50 m$^2$/g or more, and more preferably 150 m$^2$/g or more, and preferably 2000 m$^2$/g or less, and more preferably 750 m$^2$/g or less. The average particle diameter of powder of the refractory inorganic oxide is preferably 0.5 μm or more, and more preferably 1 μm or more, and preferably 150 μm or less, and more preferably 100 μm or less.

The ratio ($S_2/S_1 \times 100$) of the BET specific surface area $S_2$ after exposure of the refractory inorganic oxide to a waste gas of 1000° C. or higher and 1100° C. or lower to the BET specific surface area $S_1$ after exposure to the exhaust gas is preferably 5% or more, more preferably 10% or more, and further preferably 30% or more, and preferably 90% or less, more preferably 70% or less, and further preferably 60% or less.

(Method for Producing Catalyst)

The catalyst of the present invention can be produced by application of a known method for producing a catalyst.

It is preferable that in a method for producing the catalyst of the present invention, a slurry or aqueous solution containing a compound (raw material) of a noble metal element (e.g., Pd, or Rh and Pd) is used. For example, desired amounts of the refractory inorganic oxide, the oxygen storage material, and a compound (raw material) of a group 2 element are mixed, the mixture is stirred for an appropriate time (preferably 15 minutes or more and 24 hours or less) to obtain a slurry, a compound (raw material) of a noble metal element (e.g., Pd) is mixed in the slurry, and the slurry is further stirred for an appropriate time (preferably 15 minutes or more and 24 hours or less). The obtained slurry is then placed in a wet milling device, and milled for an appropriate time (preferably 15 minutes or more and 5 hours or less) to obtain a slurry containing raw materials for catalyst components to be laminated for the first catalyst layer, the second catalyst layer, and the third catalyst layer. The amount of solid in the slurry is preferably 5% by mass or more, and more preferably 10% by mass or more, relative to the amount of the slurry. The amount of solid in the slurry is preferably 60% by mass or less, and more preferably 50% by mass or less, relative to the amount of the slurry. Wet-milling is generally performed by a known method, and is not particularly limited. For example, a wet-milling method using a ball mill or the like can be performed.

An aqueous solution of a compound (raw material) of a noble metal element (e.g., Pd or Rh) means an aqueous solution containing the compound (raw material) of Pd when only palladium is used as the noble metal element. When as the noble metal element, rhodium and palladium are used in combination, the aqueous solution of a compound (raw material) of noble metal element means an aqueous solution containing a compound (raw material) of Rh and a compound (raw material) of Pd. In this case, the aqueous solution may be a mixed solution of an aqueous solution of the compound (raw material) of Rh and an aqueous solution of the compound (raw material) of Pd, or an aqueous solution obtained by dissolving the compound (raw material) of Rh and the compound (raw material) of Pd in the same solution.

For a solvent that uniformly dissolves the water-soluble noble metal salt described above, water, alcohol, or a mixture of water and alcohol can be used. As the alcohol, ethanol, 1-propanol, or 2-propanol can be used. The concentration (content) of the water-soluble metal salt in the solvent is not particularly limited, and can be appropriately selected depending on the supported amount of the noble metal element.

More specifically, slurries to be laminated as catalyst components for the first catalyst layer, the second catalyst layer, and the third catalyst layer are each produced. A desired amount of each of the slurries is applied to the support (e.g., refractory three-dimensional structure) at a desired position in desired length and thickness, to form the layer structure of the present invention. For example, the slurry for the first catalyst is applied from the end face on the upstream side toward the downstream side, dried, and then calcined. Subsequently, the slurry for the second catalyst is applied from the end face on the downstream side toward the upstream side, dried, and then calcined. The slurry for the third catalyst is then applied from the end face on the upstream side toward the downstream side, dried, and then calcined. As a result, the catalyst of the present invention is obtained. Here, an order of applying the slurry for the first catalyst layer and the slurry for the second catalyst is not particularly limited. After the slurry for the first catalyst layer and the slurry for the second catalyst layer are applied and dried, calcination may not be necessary. After the slurry for the first catalyst layer and the slurry for the second catalyst layer are applied and dried, the slurry for the third catalyst layer may be applied, and calcination may be then performed. After the slurry for the third catalyst layer is applied, drying and calcination may be performed separately or in one process with the increased temperature in the furnace.

As a method for confirming the application state, length, and thickness of each slurry in preparation of the catalyst, for example, a method in which the catalyst obtained by application under some application condition is crushed in advance, and the length, thickness, and amount of the catalyst are confirmed by a vernier caliper, an electronic balance, and a microscope such as a three-dimensional (3D) microscope can be used. The length and thickness of the catalyst can be measured by an X-ray CT device without crushing the catalyst. When the slurries are applied under such a condition that achieves desired lengths, thicknesses, and amounts, a suitable catalyst can be easily produced.

Each slurry obtained as described above is immersed in a three-dimensional structure to achieve the desired length, thickness, and amount are desired, dried at an appropriate temperature (preferably 50° C. or higher and 300° C. or lower) for an appropriate time (preferably 5 minutes or more, and more preferably 30 minutes or more, and preferably 10 hours or less, and more preferably 8 hours or less), and if necessary, calcined at an appropriate temperature (preferably 300° C. or higher, and more preferably 400° C. or higher, and preferably 1200° C. or lower, and more preferably 700° C. or lower) for an appropriate time (preferably 10 minutes or more, and more preferably 30 minutes or more, and preferably 10 hours or less, and more preferably 5 hours or less). Thus, a catalyst layer is formed on the support or another catalyst layer.

The catalyst of the present invention is useful as a catalyst for engines used for an extended period of time. In an engine used for 100 hours or more or 1000 hours or more, the catalyst of the present invention can purify exhaust gas over the extended period of time such as 100 hours or more and 1000 hours or more.

The internal combustion engine is not particularly limited. For example, a gasoline engine, a hybrid engine, or an engine using a fuel such as natural gas, ethanol, and dimethyl ether can be used. Among these, a gasoline engine is preferably used.

The time duration for which the exhaust gas purification catalyst is exposed to the exhaust gas is not particularly limited, and a time in which at least a part of the exhaust gas purification catalyst can be brought into contact with the exhaust gas may be secured.

The temperature of the exhaust gas is not particularly limited, and is preferably 0° C. or higher and 800° C. or lower. That is, it is preferable that the temperature fall within the temperature range of exhaust gas during normal driving. Here, the air/fuel ratio (A/F) of the exhaust gas of 0° C. to 800° C. of the internal combustion engine is preferably 10 or more, and more preferably 11 or more. The air/fuel ratio is preferably less than 30, and more preferably 19 or less.

The catalyst of the present invention as described above or the catalyst produced by the method as described above may be exposed to exhaust gas of higher than 800° C., for example, to exhaust gas of 800° C. to 1200° C. Here, the air/fuel ratio of the exhaust gas of 800° C. to 1200° C. is preferably 10 to 18.6. Here, the time for exposing the exhaust gas purification catalyst to the exhaust gas of 800° C. to 1200° C. is not particularly limited, and may be 5 to 500 hours. Even after exposure to such a high-temperature exhaust gas, the catalyst of the present invention has high performance. In examination of exhaust gas purification performance of the catalyst after exposure of the catalyst to the high-temperature exhaust gas, it is useful to first expose the catalyst to exhaust gas of 800° C. to 1200° C. for 5 to 500 hours as a heat treatment, and then examine the exhaust gas purification performance.

Exhaust gas in which the present invention particularly achieves a significant effect is exhaust gas containing a phosphorus compound. Even when the catalyst of the present invention is exposed to a phosphorus compound in exhaust gas for an extended period of time, the catalyst of the present invention can purify the exhaust gas. Even when a phosphorus compound in an amount of 1 g or more in terms of phosphorus oxide ($P_2O_5$) per liter of the support (e.g., three-dimensional structure) is accumulated in the catalyst during exposure to the exhaust gas containing a phosphorus compound, a sufficiently large amount of the phosphorus compound is deposited at the upstream portion and middle portion (space portion) of the third catalyst layer. Therefore, the amount of phosphorus compound deposited at the downstream portion of the third catalyst layer is decreased, and the influence of the phosphorus compound on the activity of the catalyst component is decreased. Accordingly, in consideration of the whole catalyst, the purification performance is high. Even when a phosphorus compound in an amount of 50 g or less, effectively 30 g or less, further effectively 15 g or less, and the most effectively 10 g or less in terms of phosphorus oxide ($P_2O_5$) per liter of the support (e.g., three-dimensional structure) is accumulated, a sufficiently large amount of the phosphorus compound is deposited at the upstream portion and middle portion (space portion) of the third catalyst layer. Therefore, the influence of the phosphorus compound on the activity of the catalyst component on the downstream side of the third catalyst layer is decreased. Accordingly, in consideration of the whole catalyst, the purification performance is high.

(Phosphorus Compound)

As a phosphorus compound causing phosphorus poisoning, for example, zinc dialkyl dithiophosphate or the like is known. The catalyst of the present invention is particularly useful in purification of exhaust gas from a gasoline engine using a lubricant containing a phosphorus compound.

When the catalyst layers are used as coatings on a refractory three-dimensional structure, the phosphorus compound is generally disposed in a high concentration on a surface of the catalyst layers, and the concentration distribution of the phosphorus compound at the inside of the catalyst layers depth wise is uneven. The concentration of the phosphorus compound is decreased as the phosphorus compound is closer to the three-dimensional structure. The concentration of the phosphorus compound is increased as the phosphorus compound gets closer to the outermost surface of the coating layer which is in contact with gas layer. On the other hand, the concentration distribution of the phosphorus compound in the exhaust gas flowing direction is also uneven. In general, the concentration of the phosphorus compound is increased as the phosphorus compound gets closer to the end face on the inflow side, and the concentration of the phosphorus compound is decreased as the phosphorus compound gets closer to the end face on the outflow side. However, the concentration between the end face on the inflow side and the end face on the outflow side is not specifically high. The catalyst of the present invention includes the middle portion with desired length and thickness at a desired position in the exhaust gas flowing direction. Therefore, the amount of phosphorus compound disposed at the position of the middle portion is larger than that in a case where a middle portion is not provided.

The distribution of the phosphorus compound deposited on the catalyst layers in the exhaust gas flowing direction can be analyzed by a method such as x-ray fluorescence analysis (XRF). The concentration distribution of the phosphorus compound at the inside of the catalyst layers in the depth direction is obtained by analyzing a mapping image that is obtained by analysis of spectrum belonging to a phosphorus (P) Kα ray in accordance with analysis by an electron probe microanalyzer (EPMA). The same analysis can be performed by SEM-EDX or the like.

The present invention is described above for easy understanding by illustrating the preferred embodiments. Hereinafter, the present invention will be described on the basis of Examples. The aforementioned description and the following Examples are provided for illustrative purpose only, and are not intended to limit the present invention. Therefore, the scope of the present invention is not limited to embodiments and examples that are specifically described in the specification, and is only limited by the claims of the present invention.

EXAMPLES

The present invention will be specifically described in accordance with the following Examples. The present invention is not limited to these Examples, and Examples obtained by appropriately combining technical approaches disclosed in each of Examples also fall within the scope of the present invention.

Example 1

Method for Producing Catalyst

An aqueous solution of palladium nitrate, a $CeO_2$—$ZrO_2$ composite oxide, aluminum oxide ($Al_2O_3$), barium sulfate, and lanthanum acetate were each weighed so that the mass ratio of palladium (Pd):$CeO_2$—$ZrO_2$ composite oxide: $Al_2O_3$:barium sulfate ($BaSO_4$):lanthanum oxide ($La_2O_3$)

was 3.54:38:38:10:0.4, and mixed in water. The mixture was wet-milled by a ball mill to produce the slurry a0.

Subsequently, the slurry a0 was wash-coated on the cordierite substrate from the end face on the upstream side to the length shown in Table 1, with the supported amount of Pd shown in Table 2 after calcination, and then dried at 150° C. for 15 minutes. The refractory three-dimensional structure was cylindrical shape with a diameter of 118.4 mm and a length of 91 mm (1.0-L), and including 600 cells with a wall thickness of 3.5 mil (0.0889 mm) per square inch (6.45 cm$^2$). As a result, the intermediate product A1 in which the first catalyst layer was formed on the refractory three-dimensional structure was obtained.

Next, the slurry a0 was wash-coated on the intermediate product A1 with the length from the end face on the downstream side to the length of the second catalyst layer shown in Table 1, with the supported amount shown in Table 2 after calcination, and then dried and calcined in the same manner as described above. As a result, the intermediate product A2 having the first catalyst layer and the second catalyst layer was obtained. The length $L_2$ of the middle portion of the intermediate product A2 was measured by a vernier caliper, and was as shown in Table 1.

An aqueous solution of rhodium nitrate, an aqueous solution of palladium nitrate, a $CeO_2$—$ZrO_2$ composite oxide, aluminum oxide, and lanthanum oxide were each weighed so that the mass ratio of Rh:Pd:$CeO_2$—$ZrO_2$ composite oxide:$Al_2O_3$:$La_2O_3$ was 0.225:0.14:47:60:0.8, and mixed in water. The mixture was wet-milled by a ball mill to produce the slurry a3.

The intermediate product A2 was wash-coated with the produced slurry a3 from the upstream side toward the downstream side of a catalyst so that the supported amount after calcination was 108 g per liter of the support in terms of Rh, Pd, $CeO_2$—$ZrO_2$ composite oxide, $Al_2O_3$, $BaSO_4$, and $La_2O_3$, dried at 150° C. for 15 minutes, and calcined at 550° C. for 30 minutes. As a result, a catalyst A having the first catalyst layer, the second catalyst layer, and a third catalyst layer was obtained.

Example 2

The catalyst B was produced in the same manner as in production of catalyst A except that coating was performed so that lengths were values shown in Table 1 and the noble metal amounts correspond to the values shown in Table 2.

Example 3

The catalyst C was produced in the same manner as in production of catalyst A except that coating was performed so that lengths were values shown in Table 1 and the noble metal amounts correspond to the values shown in Table 2.

Example 4

The catalyst D was produced in the same manner as in production of catalyst A except that coating was performed so that lengths were values shown in Table 1 and the noble metal amounts correspond to the values shown in Table 2.

Example 5

The catalyst E was produced in the same manner as in production of the catalyst A except that coating was performed so that lengths were values shown in Table 1 and the noble metal amounts correspond to the values shown in Table 2.

Comparative Example 1

The same support as described above was coated with the slurry a0 so that the first catalyst layer had the length shown in Table 1, to obtain an intermediate product F1. Subsequently, the intermediate product F1 was continuously wash-coated with the slurry a0 from the end face on the downstream side so as to prevent formation of a middle portion, and then dried and calcined in the same manner as described above. As a result, the intermediate product F2 having the first catalyst layer and a second catalyst layer was obtained. It was confirmed that the intermediate product F2 had no middle portion.

The intermediate product F2 was wash-coated with the slurry a3 from the upstream side toward the downstream side of a catalyst so that the supported amount after calcination was 108 g per liter of the support, and then dried and calcined in the same manner as described above. As a result, a catalyst F having no middle portion was obtained.

Example 6

The catalyst G was produced in the same manner as in production of the catalyst A except that coating was performed so that lengths were values shown in Table 1 and the noble metal amounts correspond to the values shown in Table 2.

Example 7

The catalyst H was produced in the same manner as in production of the catalyst A except that coating was performed so that lengths were values shown in Table 1 and the noble metal amounts correspond to the values shown in Table 2.

Example 8

The catalyst I was produced in the same manner as in production of the catalyst A except that coating was performed so that lengths were values shown in Table 1 and the noble metal amounts correspond to the values shown in Table 2.

Example 9

An aqueous solution of palladium nitrate, a $CeO_2$—$ZrO_2$ composite oxide, aluminum oxide ($Al_2O_3$), barium sulfate, and lanthanum acetate were each weighed so that the mass ratio of Pd:$CeO_2$—$ZrO_2$ composite oxide:$Al_2O_3$:$BaSO_4$:$La_2O_3$ was 1.18:14.07:14.07:3.7:0.15, and wet-milled to produce a slurry j1 with the same component ratio as that of the slurry a0 except for noble metals.

An aqueous solution of palladium nitrate, a $CeO_2$—$ZrO_2$ composite oxide, aluminum oxide ($Al_2O_3$), barium sulfate, and lanthanum acetate were each weighed so that the mass ratio of Pd:$CeO_2$—$ZrO_2$ composite oxide:$Al_2O_3$:$BaSO_4$:$La_2O_3$ was 2.36:23.93:23.93:6.3:0.25, and wet-milled to produce a slurry j2 with the same component ratio as that of the slurry a0 except for noble metals. In the same manner as in production of the catalyst A except that in wash-coating, the slurry k1 was used, an intermediate product J1 was obtained. Subsequently, the intermediate product J1 was wash-coated with the slurry j2 to obtain the intermediate product J2. The obtained intermediate product J2 was wash-coated with the slurry a3 from the upstream side toward the downstream side of a catalyst so that the supported amount after calcination was 108 g per liter of the support, and then dried and calcined in the same manner as described above. As a result, a catalyst J having a first catalyst layer, a second catalyst layer, and a third catalyst layer was obtained.

Example 10

The catalyst K was produced in the same manner as in production of the catalyst J except that coating was performed so that the noble metal amounts correspond to the values shown in Table 2.

Example 11

The catalyst L was produced in the same manner as in production of the catalyst J except that coating was performed so that the noble metal amounts correspond to the values shown in Table 2.

Example 12

The catalyst M was produced in the same manner as in production of the catalyst J except that coating was performed so that the noble metal amounts correspond to the values shown in Table 2.

Comparative Example 2

The same support as the support of the catalyst A was wash-coated with the slurry a0 from the end face on the upstream side to the end face on the downstream side so that the supported amount after calcination was 89.9 g per liter of the support, dried at 150° C. for 15 minutes, and calcined at 550° C. for 30 minutes. As a result, an intermediate product N1 was obtained.

In the same manner as in production of the catalyst A, the intermediate product N1 was wash-coated with the slurry a3, dried, and calcined. As a result, a catalyst N without a second catalyst layer and a middle portion was obtained.

The length of the first catalyst layer, the proportion of starting position of the middle portion to the overall length of the catalyst, the length of the middle portion of the third catalyst layer, the proportion of the length of the middle portion to the overall length of the catalyst, and the length of the second catalyst layer are shown in Table 1.

In the catalysts F and N, a middle portion was not provided.

TABLE 1

Lengths of each catalyst layer

| Catalyst | Length of first catalyst layer ($L_1$) [mm] | Proportion of starting position of middle portion [%] | Length of middle portion ($L_2$) [mm] | Proportion of length of middle portion [%] | Length of second catalyst layer ($L_3$) [mm] |
|---|---|---|---|---|---|
| A | 10 | 11.0 | 9 | 9.9 | 72 |
| B | 20 | 22.0 | 9 | 9.9 | 62 |
| C | 30 | 33.0 | 9 | 9.9 | 52 |
| D | 40 | 44.0 | 9 | 9.9 | 42 |
| E | 60 | 66.0 | 9 | 9.9 | 22 |
| F | 40 | 44.0 | 0 | 0 | 51 |

TABLE 1-continued

Lengths of each catalyst layer

| Catalyst | Length of first catalyst layer ($L_1$) [mm] | Proportion of starting position of middle portion [%] | Length of middle portion ($L_2$) [mm] | Proportion of length of middle portion [%] | Length of second catalyst layer ($L_3$) [mm] |
|---|---|---|---|---|---|
| G | 40 | 44.0 | 5 | 5.5 | 46 |
| H | 40 | 44.0 | 15 | 16.5 | 36 |
| I | 40 | 44.0 | 20 | 22.0 | 31 |
| J | 30 | 33.0 | 9 | 9.9 | 52 |
| K | 30 | 33.0 | 9 | 9.9 | 52 |
| L | 30 | 33.0 | 9 | 9.9 | 52 |
| M | 30 | 33.0 | 9 | 9.9 | 52 |
| N | 91 | — | — | — | 0 |

The supported amounts [g/L] of Pd and Rh contained in the first catalyst layer, the second catalyst layer, and the third catalyst layer, and the content [%] of noble metal in the first catalyst layer relative to the total noble metal amount of the first catalyst layer and the second catalyst layer are shown in Table 2.

TABLE 2

Noble metal amount in each catalyst layer and noble metal content in first catalyst layer

| Catalyst | First catalyst layer Pd [g/L] | Second catalyst layer Pd [g/L] | Third catalyst layer Pd [g/L] | Third catalyst layer Rh [g/L] | Noble metal content in first catalyst layer [%] |
|---|---|---|---|---|---|
| A | 2.36 | 1.18 | 0.14 | 0.225 | 66.7 |
| B | 2.36 | 1.18 | 0.14 | 0.225 | 66.7 |
| C | 2.36 | 1.18 | 0.14 | 0.225 | 66.7 |
| D | 2.36 | 1.18 | 0.14 | 0.225 | 66.7 |
| E | 2.36 | 1.18 | 0.14 | 0.225 | 66.7 |
| F | 2.36 | 1.18 | 0.14 | 0.225 | 66.7 |
| G | 2.36 | 1.18 | 0.14 | 0.225 | 66.7 |
| H | 2.36 | 1.18 | 0.14 | 0.225 | 66.7 |
| I | 2.36 | 1.18 | 0.14 | 0.225 | 66.7 |
| J | 1.18 | 2.36 | 0.14 | 0.225 | 33.3 |
| K | 1.77 | 1.77 | 0.14 | 0.225 | 50.0 |
| L | 2.66 | 0.88 | 0.14 | 0.225 | 75.1 |
| M | 3.01 | 0.53 | 0.14 | 0.225 | 85.0 |
| N | 3.54 | | 0.14 | 0.225 | — |

The thicknesses $H_3$, $H_4$, and $H_5$ of the catalyst layers were measured by a 3D microscope. The ratio [%] of $H_4$ to $H_3$, the ratio [%] of $H_4$ to $H_5$, and the ratio [%] of $H_5$ to $H_3$ were calculated. The results are shown in Table 3.

TABLE 3

Thickness $H_3$, $H_4$, and $H_5$ of catalyst, ratio of $H_4$ to $H_3$, ratio of $H_4$ to $H_5$, and ratio of $H_5$ to $H_3$

| Catalyst | $H_3$ [µm] | $H_4$ [µm] | $H_5$ [µm] | $H_4/H_3$ [%] | $H_4/H_5$ [%] | $H_5/H_3$ [%] |
|---|---|---|---|---|---|---|
| A | 110 | 61 | 104 | 56 | 59 | 95 |
| B | 112 | 62 | 100 | 55 | 62 | 89 |
| C | 114 | 59 | 99 | 52 | 60 | 87 |
| D | 113 | 60 | 101 | 53 | 59 | 89 |
| E | 116 | 57 | 98 | 49 | 58 | 84 |
| F | 111 | — | 100 | — | — | 90 |
| G | 109 | 62 | 101 | 57 | 61 | 93 |
| H | 115 | 58 | 98 | 50 | 59 | 85 |
| I | 114 | 60 | 97 | 53 | 62 | 85 |
| J | 108 | 66 | 108 | 61 | 61 | 100 |

TABLE 3-continued

Thickness $H_3$, $H_4$, and $H_5$ of catalyst, ratio of $H_4$ to $H_3$, ratio of $H_4$ to $H_5$, and ratio of $H_5$ to $H_3$

| Catalyst | $H_3$ [μm] | $H_4$ [μm] | $H_5$ [μm] | $H_4/H_3$ [%] | $H_4/H_5$ [%] | $H_5/H_3$ [%] |
|---|---|---|---|---|---|---|
| K | 106 | 59 | 105 | 56 | 56 | 99 |
| L | 110 | 58 | 98 | 53 | 59 | 89 |
| M | 113 | 63 | 94 | 56 | 67 | 83 |
| N | 106 | — | 104 | — | — | 98 |

<Thermal Durability Test>

Each of the catalysts obtained in the Examples described above was provided on a downstream side of a 3.0-L engine, and the temperature of a catalyst bed part was set to 940° C. The engine was a gasoline engine. A cycle in which the A/F ratio of a catalyst inlet portion was set to a stoichiometric A/F ratio, and set to a rich A/F ratio, and supply of a fuel was stopped was repeated for 66 hours in total. Thus, a thermal durability test was performed.

Next, the catalyst that had been subjected to a heat treatment was provided on a downstream side of exhaust gas port of the 3.0-L engine. The temperature of the catalyst bed part was set to 740° C. and operated using an oil with a phosphorus (P) concentration of 3000 ppm an engine oil for 44 hours. Thus, the catalyst was subjected to a phosphorus poisoning treatment. The phosphorus content of each of the catalysts thus treated was analyzed by XRF. Thus, it was confirmed that the catalysts each contained 7.5 g of phosphorus compound per liter of the support (e.g., three-dimensional structure) as phosphorus oxide ($P_2O_5$).

<Amount of Phosphorus Compound Attached to Exhaust Gas Purification Catalyst>

The distribution of amount of phosphorus attached to each of the catalysts D, F, G, and H, which have a first catalyst layer with a length of 40 mm, was examined. The catalysts B and E that had suffered from phosphorus poisoning were each cut at positions of 40 mm, 45 mm, 50 mm, 55 mm and 60 mm in the outflow direction from the end face on the exhaust gas inflow side that was 0 mm (in Table 4, a portion of 40 mm or more and less than 45 mm is represented by 40 to 45 mm, and other portions are represented similarly). The amount of phosphorus compound deposited at each portion on the downstream side of the position of 40 mm (in terms of $P_2O_5$) was analyzed by XRF. Table 4 shows the deposition distribution [%] of phosphorus compound obtained by dividing the amount of phosphorus compound contained at each portion of 40 mm to 91 mm by the total amount of phosphorus compound contained at portions on the downstream side of the position of 40 mm.

As seen from Table 4, the deposition rate of phosphorus compound in the catalyst F without a middle portion decreases from the upstream side toward the downstream side, and in the catalysts G, D, and H having a middle portion, the phosphorus compound is deposited at the middle portion or on the downstream side of the middle portion with a specifically high deposition rate. For the catalyst G, for example, the deposition rate of phosphorus was 38 at a portion of 40 to 45 mm, which was the middle portion, and was 21 at another portion (45 to 50 mm). At the middle portion, a larger amount of phosphorus compound is detected. For the catalyst D, the deposition rate was 37 at the portion of 45 to 50 mm which was on the downstream side of the middle portion, and was 16 at another portion (50 to 55 mm). For the catalyst H, the deposition rate was 35 at a portion of 50 to 55 mm which was on the downstream side of the middle portion, was 5 at a portion of 55 to 60 mm which was on the downstream side, and was 25 at a portion of 40 to 45 mm which was on the upstream side. At the middle portion, an excessively large amount of phosphorus is deposited as compared to the other portions. For the catalyst F which has no middle portion, the amount of phosphorus deposited on an upstream side of the catalyst that first comes into contact with exhaust gas is large, and the amount of phosphorus deposited on a downstream side of the catalyst is small. These results show that a large amount of phosphorus compound is detected at the middle portion or on the downstream side of the middle portion, and the deposition of phosphorus compound on the downstream side is suppressed compared to that at the middle portion. At the first catalyst layer and the second catalyst layer that contain a large amount of catalytic component and the third catalyst layer that is laminated on the first catalyst layer and the second catalyst layer, phosphorus poisoning can be suppressed.

TABLE 4

Amount of phosphorus compound deposited at each portion compared to the phosphorus compound deposited at the downstream side after 40 mm (in %)

| Catalyst | Length of middle portion [mm] | 40-45 [mm] | 45-50 [mm] | 50-55 [mm] | 55-60 [mm] | 60-91 [mm] |
|---|---|---|---|---|---|---|
| F | 0 | 28 | 22 | 20 | 15 | 15 |
| G | 5 | 38 | 21 | 18 | 10 | 13 |
| D | 9 | 31 | 37 | 16 | 8 | 8 |
| H | 15 | 25 | 29 | 35 | 5 | 6 |

<Evaluation of Performance of Exhaust Gas Purification Catalyst>

Each of the catalysts after the heat treatment was attached on the downstream side of a 2.0-L engine. The temperature was stabilized at 100° C., and the exhaust gas temperature at the catalyst inlet was increased from 100° C. to 500° C. The engine was a gasoline engine. A gas discharged from a catalyst outlet was sampled, and the purification ratio of each of CO, THC, and $NO_x$ was calculated. A temperature at which the purification ratio reached 50% after starting a temperature increase was T50. This time required to reach T50 was examined.

(Effect of Starting Position of Middle Portion)

The proportion of a position where the middle portion started to the overall length of each of the catalysts A to E was calculated by the following formula.

$$L_1 \div L \times 100$$

FIG. 2 shows a graph in which the horizontal axis is the calculated proportion of the starting position of the middle portion to the overall length of catalyst [%] and the vertical axis is the time [second] required to reach T50. As seen from FIG. 2, the times required to reach T50 of the catalysts in the Examples are smaller than those in the Comparative Examples, and in the Examples, exhaust gas is rapidly purified.

(Effect of Length of Middle Portion)

The effect of length of the middle portion was evaluated in the same manner as described above. For the catalysts D, F, G, H, and I in which the starting positions of the middle portions are the same and the lengths of the middle portions are different, the time required to reach T50 was measured. FIG. 3 shows a graph in which the horizontal axis is the proportion [%] of length of the middle portion to the overall length of the catalyst and the vertical axis is the time [second] required to reach T50.

As seen from FIG. 3, the times required to reach T50 of the catalysts in the Examples are smaller than those in the Comparative Examples, and in Examples, exhaust gas is rapidly purified.

(Effect of Noble Metal Distribution)

The effect of noble metal distribution was evaluated in the same manner as described above. For the catalysts C, J, K, L, and M in which the starting positions of the middle portions were the same, the lengths of the middle portions were the same, and the noble metal distributions were different, the time required to reach T50 was measured. FIG. 4 is a graph in which the horizontal axis is the proportion [%] of noble metal amount in the first catalyst layer to the total noble metal amount in the first catalyst layer and the second catalyst layer and the vertical axis is the time [second] required to reach T50.

As seen from the graph involved with the concentration of palladium contained in the first catalyst layer (exhaust gas upstream side), the times required to reach T50 of the catalysts in the Examples are smaller than those in the Comparative Examples, and in the Examples, and exhaust gas is rapidly purified.

The time required to reach T50 for the catalyst N (which palladium is contained in the first catalyst layer and had no middle portion) and the catalyst C (which palladium is contained in both the first catalyst layer and the second catalyst layer) was evaluated in the same manner as described above. FIG. 5 shows the time required to reach T50 with that of the catalyst C.

As described above, the present invention is described using the preferred embodiments of the present invention. However, it is understood that the scope of the present invention should be only interpreted by the claims. It is understood that patents, patent applications, and other references cited herein should be incorporated herein by reference in the same manner as the content specifically described herein.

INDUSTRIAL APPLICABILITY

The exhaust gas purification catalyst according to the present invention can efficiently purify exhaust gas from an internal combustion engine even after long-term use. Therefore, the exhaust gas purification catalyst can be widely applied to industries using an internal combustion engine, such as automobiles, railways, ships, aviation, and various industrial machines. The catalyst of the present invention is useful in purification of exhaust gas from a gasoline engine, and particularly useful in purification of exhaust gas from a gasoline engine using a phosphorus compound as a lubricant.

The invention claimed is:

1. An exhaust gas purification catalyst comprising: a support; a first catalyst layer on an upstream side: a second catalyst layer on a downstream side; and a third catalyst layer,
    wherein an upstream portion of the third catalyst layer is present on the first catalyst layer,
    a downstream portion of the third catalyst layer is present on the second catalyst layer, and
    a middle portion of a third catalyst layer between the upstream portion and the downstream portion is present between the first catalyst layer and the second catalyst layer,
    wherein the first catalyst layer and second catalyst layer are present directly on the support, and
    wherein a thickness of the middle portion is smaller than a thickness of the upstream portion and a thickness of the downstream portion.

2. The catalyst according to claim 1, wherein a proportion of a length of the first catalyst layer to an overall length of the catalyst is 10% to 70%.

3. The catalyst according to claim 1, wherein a proportion of a length of the middle portion of the third catalyst layer to the overall length of the catalyst is 1% to 25%.

4. The catalyst according to claim 1, wherein the first catalyst layer, the second catalyst layer, and the third catalyst layer contain cerium.

5. A method for purifying an exhaust gas containing a phosphorus compound comprising contacting the exhaust gas with the catalyst according to claim 1.

6. An exhaust gas purification method comprising a step of bringing exhaust gas into contact with the catalyst according to claim 1.

7. The catalyst according to claim 1, wherein the first catalyst layer and the second catalyst layer are not in direct contact with each other.

8. The catalyst according to claim 1, wherein the first catalyst layer is different from the second catalyst layer.

9. The catalyst according to claim 1, wherein the thickness of the middle portion is bigger than a thickness of the first catalyst layer and a thickness of the second catalyst layer.

10. An exhaust gas purification catalyst comprising: a support; a first catalyst layer on an upstream side: a second catalyst layer on a downstream side; and a third catalyst layer, wherein an upstream portion of the third catalyst layer is present on the first catalyst layer, a downstream portion of the third catalyst layer is present on the second catalyst layer, and a middle portion of a third catalyst layer between the upstream portion and the downstream portion is present between the first catalyst layer and tire second catalyst layer, wherein the first catalyst, layer and second catalyst layer are present, directly on the support, wherein a thickness of the middle portion is smaller than a thickness of the upstream portion and a thickness of the downstream portion, wherein all of the first catalyst layer, the second catalyst layer, and the third catalyst layer contain a noble metal, and a mass of the noble metal contained in the first catalyst layer is larger than a mass of the noble metal contained in the second catalyst layer.

11. An exhaust gas purification catalyst comprising: a support: a first catalyst layer on an upstream side; a second catalyst layer on a downstream side; and a third catalyst layer, wherein an upstream portion of the third catalyst layer is present on the first catalyst, a downstream portion of the third catalyst layer is present on the second catalyst layer, and a middle portion of a third catalyst layer between the upstream portion and the downstream portion is present between the first catalyst layer and the second catalyst layer, wherein the first catalyst layer and second catalyst layer are present directly on the support, wherein a thickness of the middle portion is smaller than a thickness of the upstream portion and a thickness of the downstream portion, wherein the third catalyst layer contains rhodium and palladium, and the first catalyst layer and the second catalyst layer contain palladium.

* * * * *